July 28, 1931.  C. C. KAMPHAUSEN  1,816,225
BURRING MACHINE
Filed May 12, 1930  6 Sheets-Sheet 1

INVENTOR.
Carl C. Kamphausen.
BY
ATTORNEY.

July 28, 1931.  C. C. KAMPHAUSEN  1,816,225
BURRING MACHINE
Filed May 12, 1930  6 Sheets-Sheet 3

INVENTOR.
Carl C. Kamphausen.
BY
ATTORNEY.

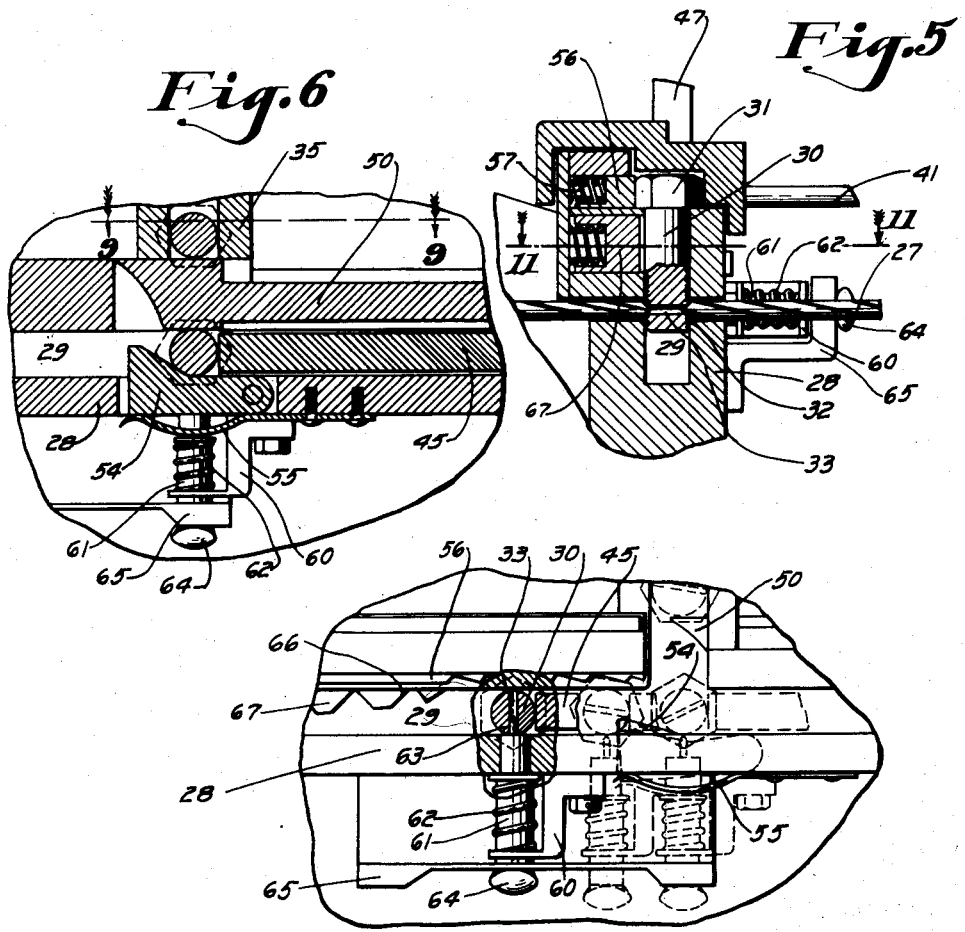

July 28, 1931.   C. C. KAMPHAUSEN   1,816,225
BURRING MACHINE
Filed May 12, 1930   6 Sheets-Sheet 5

INVENTOR.
Carl C. Kamphausen,
BY
ATTORNEY.

Witness:

Patented July 28, 1931

1,816,225

UNITED STATES PATENT OFFICE

CARL C. KAMPHAUSEN, OF FERNDALE, MICHIGAN, ASSIGNOR TO FORD MOTOR COMPANY, OF DEARBORN, MICHIGAN, A CORPORATION OF DELAWARE

BURRING MACHINE

Application filed May 12, 1930. Serial No. 451,591.

The object of my invention is to provide a burring machine especially adapted to burr or slightly countersink the cotter pin holes disposed in the threaded ends of machine bolts. It is well known that machine bolts used in connection with castellated nuts are required to have transverse holes drilled therethrough near their outer ends to receive cotter pins for locking the nuts on the bolts. The ordinary procedure in the manufacture of such bolts consists in cold heading the bolt from round stock, then cutting or rolling the screw threads on the shank portion, then drilling the cotter pin hole through the end of the threaded portion, and then countersinking each side of this hole so that the cotter pin may be conveniently inserted after the nut has been threaded on the bolt. If such countersinking is not done a burr will usually extend across the outer ends of the hole when the nut is screwed in place so that the cotter pin cannot be conveniently inserted through the hole.

An automatic machine for drilling these cotter pin holes may be easily designed and in fact such machines are now in use. The bolts are simply intermittently fed beneath a reciprocating drill head, and as the location of this hole need only be measured from the end of the bolt a fixed stop against which the bolt is forced locates the correct position for this hole.

The purpose of this machine is to provide an automatic machine for burring these cotter pin holes which will locate the hole in each bolt in alignment with the burring tools in a simple and positive manner.

It has heretofore been impossible to provide such an automatic machine for burring these holes for the reason that the holes in the bolt must be aligned with the burring tool, and as these holes are drilled in a fixed relation only to the end of the bolt and one of the hexagonal sides on the head, the automatic alignment thereof requires a new principle of operation. There being six sides on the bolt head only two of which are parallel to the cotter pin opening, other means must be utilized for aligning these two sides and thus the opening with the burring tools.

The device herein described is adapted to automatically feed the bolts between a pair of revolving burring tools and to rotate each bolt just previous to the burring operation that portion of a revolution sufficient to line up the cotter pin hole therein with the burring tools. It will be kept in mind that this machine is entirely automatic, the bolts simply being shoveled into a hopper on the machine from which they emerge in the completed form.

With these and other objects in view my invention consists in the arrangement, construction, and combination of the various parts of my improved device as described in the specification, claimed in my claims, and illustrated in the accompanying drawings, in which:

Figure 5 shows a vertical sectional view taken on the line 5—5 of Figure 3.

Figure 6 shows a sectional view taken on the line 6—6 of Figure 4.

Figure 7 shows a diagrammatic view of the locating device shown in Figure 3, various positions of the device being shown by dotted lines to better illustrate the operation thereof.

Figure 1:
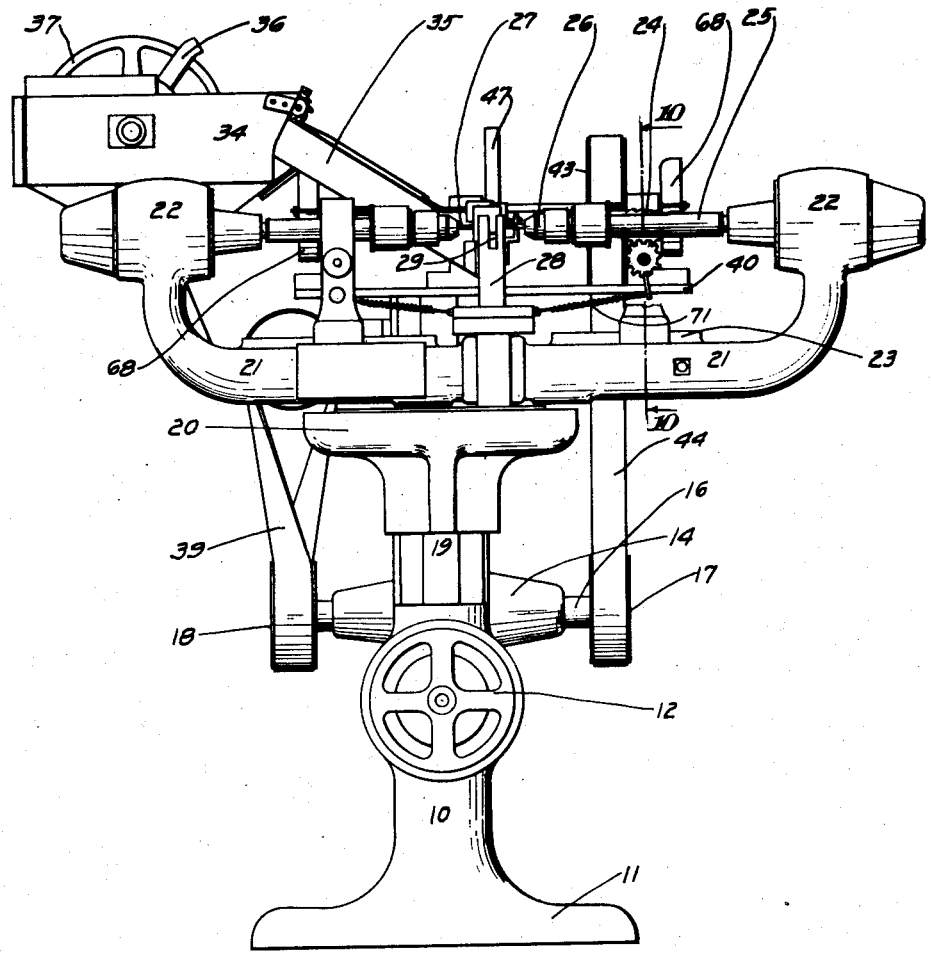
Figure 1 shows a front elevation of my improved machine, parts being broken away to better illustrate the construction.
Figure 2:
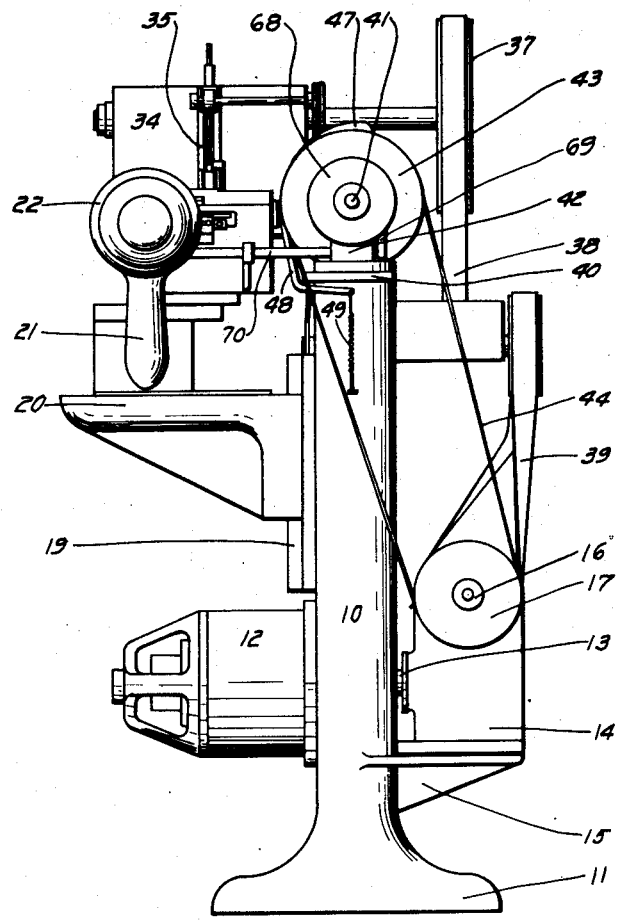
Figure 2 shows a side elevation of the machine shown in Figure 1.
Figure 3:
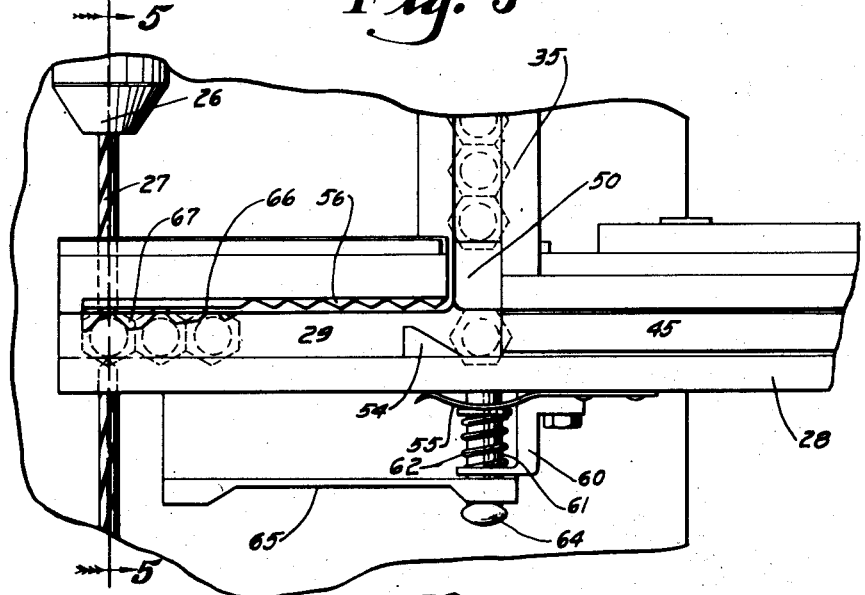
Figure 3 shows an enlarged plan view of that portion of the machine shown in Figure 1 in which the burring of the bolt is accomplished.
Figure 4:
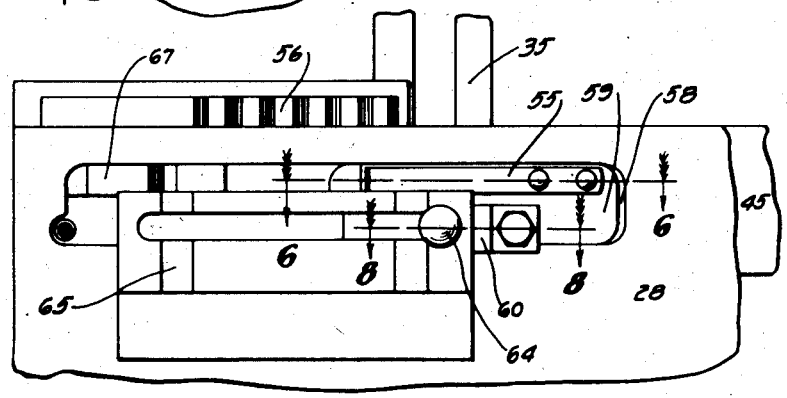
Figure 4 shows a side elevation of the portion shown in Figure 3.
Figure 8:
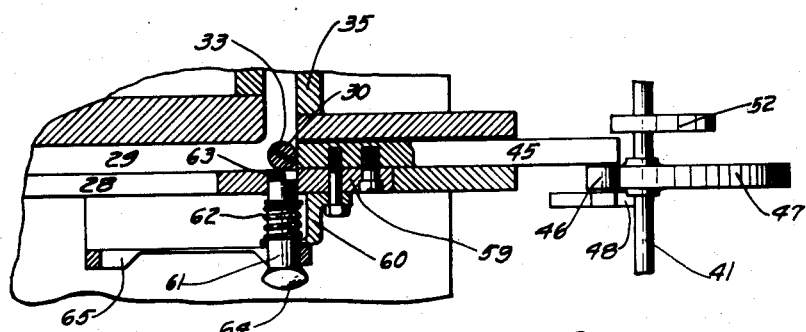
Figure 8 shows a sectional view taken on the line 8—8 of Figure 4.

Referring to the accompanying drawings, I have provided a vertical post 10 extending upwardly from a base plate 11, my device being mounted upon the upper end of this post.

An electric motor 12 is secured to the intermediate portion of this post 10 and a driving shaft 13 extends therethrough which operates a conventional speed reducer 14, the latter being mounted on a bracket 15 projecting from the rear portion of the post 10. The speed reducer 14 is provided with a transverse driven shaft 16 and a pair of pulleys 17 and 18 are secured to the ends of this shaft to respectively operate the feeding and hopper mechanisms of the machine.

The forward face of the post 10, just above the motor 12, is provided with a slide 19 upon which a table 20 is adjustably mounted. I have fixedly secured a pair of arms 21 to the upper face of the table 20 which arms extend outwardly therefrom and each of which is provided with an electric motor 22 housed in the outer end thereof. These arms 21 are provided with horizontal ways 23 upon which carriages 24 are adjustably mounted. I have provided spindles 25 telescopically connected to the driving shafts of the motors 22 which are reciprocally mounted in the carriages so as to be reciprocated toward and from each other and each of these spindles is provided with a chuck 26 in which burring tools 27 are secured. These tools are simply conventional twist drills of a diameter somewhat larger than the hole to be burred. It may thus be seen that reciprocating the spindles 25 toward and from each other will reciprocate the tools 27 which tools being rotated by the motors 22 are thus in a position to burr both ends of the cotter pin hole in a bolt 30 being machined. These spindles are reciprocated by the conventional rack and pinion mechanism, cams subsequently to be described, oscillating a pair of arms 69 on shafts 70 which extend from the pinions, and springs 71 returning the shafts and spindles to their inoperative positions.

Mounted upon the center portion of the table 20 I have provided a horizontal work holder 28 extending transversely to the spindles 25. This work holder is provided with a horizontal slot 29 in which the bolts are conveyed to position in between the pair of rotating tools 27. The bolts 30 to be machined consist of a hexagonal head 31 and a threaded portion 32. A cotter pin opening 33 is drilled transversely through the lower end of the portion 32 subsequent to the thread cutting operation, and it is to burr or countersink both ends of this opening that this machine is designed. It will be noted that the bolts 30 are vertically inserted in the slot 29 with their heads 31 resting upon the upper face of the work holder 28. Automatic means are provided for pushing each bolt through the slot 29 to position between the tools 27, and further, automatic means are provided for rotating each bolt sufficiently to align the openings 33 with the drills 27.

A bracket 40 is secured to the top of the post 10 and a cross shaft 41 is rotatably mounted in suitable bearings 42 extending from this bracket. A pulley 43 is secured to the cross shaft 41 in position to be driven by a belt 44 from the pulley 17, this cross shaft rotating a pair of cam disks 68 secured thereto. These disks are in position to operate against a pair of arms 69 fixed to the ends of the shafts 70 so that rotation of the shaft 41 will reciprocate the burring tools 27 toward and from the work.

I have provided a conventional hopper 34 mounted on one end of the machine from which a pair of spaced guide bars 35 are inclined downwardly to the work holder 28. A conventional rotating hopper scoop 36 is driven by a pulley 37, the latter being rotated by belts 38 and 39 from the pulley 18. The exact details of this hopper mechanism will not be further described, as it forms no part of my invention and because many types of hoppers may be used, it being only necessary to provide means which will keep the space between the inclined guide bars 35 filled with bolts to be machined.

The guide bars 35 intersect the slot 29 in the work holder 28 at substantially its center portion so that bolts sliding down between the two guide bars normally enter the slot 29 midway between its ends. I have provided a plunger 45 reciprocally mounted in the rear portion of the slot 29 to convey the bolts from the end of the guide bars to position between the tools 27. The rear end of the plunger 45 is provided with a roller 46 pivoted thereto which is in position to contact with the periphery of an operating cam 47 secured to the cross shaft 41. It may thus be seen that rotation of the shaft 41 will push the plunger 45 through the slot 29 thereby pushing one of the bolts into position between the drills. A bell crank lever 48 has one end connected to the plunger 45 and the other end connected with a spring 49 so as to urge the roller into contact with the cam 47 at all times.

Figure 9:
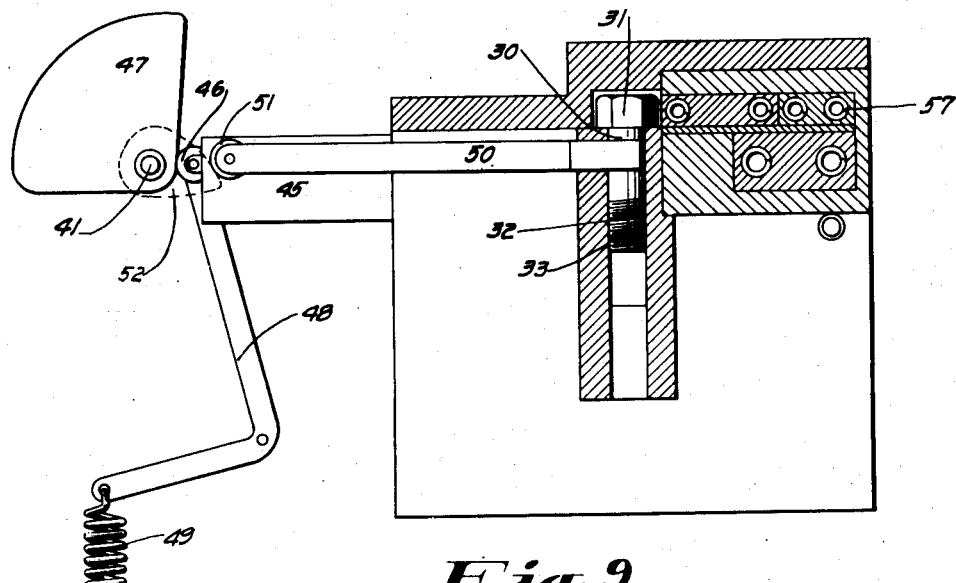
Figure 9 shows a sectional view taken on the line 9—9 of Figure 6.
Figure 10:
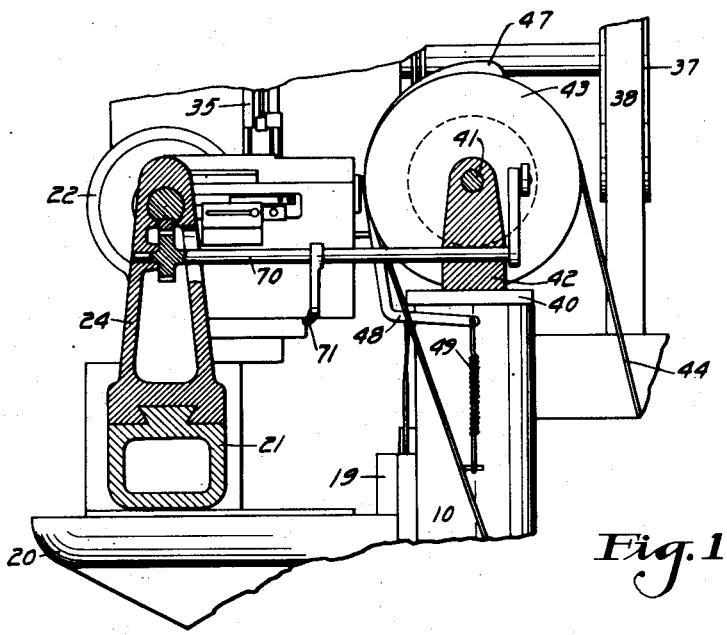
Figure 10 shows a sectional view taken on the line 10—10 of Figure 1.
Figure 11:
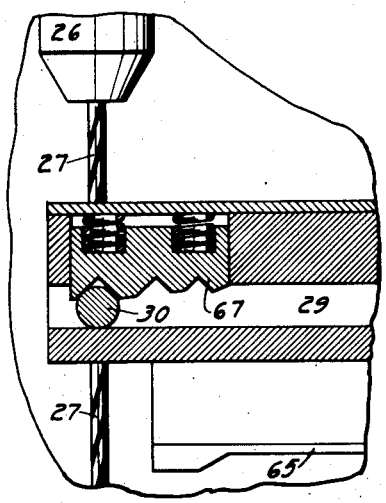
Figure 11 shows a sectional view taken on the line 11—11 of Figure 5.

Means are shown whereby as each bolt is moved by the plunger 45 through the slot 29 and the plunger is withdrawn, the next bolt will then be moved into position in front of the plunger. To accomplish this a slide 50 is reciprocally mounted in the work holder 28 parallel to the plunger 45 and is provided with a roller 51 pivotally mounted on its outer end. This roller contacts with a cam 52 mounted on the cross shaft 41 as shown by dotted lines in Figure 9 so that the plunger 50 is reciprocated in opposite phase with the plunger 45. Thus, when the plunger 45 is moved forwardly the slide 50 moves rearwardly to allow one of the bolts to slide into position adjacent to the side of the plunger 45. Inversely, when the plunger 45 is moved rearwardly, the slide 50 being provided with a cam face 53 moves forwardly to force one of the bolts into position in front of the plunger 45. This cycle is repeated for each reciprocation of the plunger. A pivoted spring detent 54 is urged by means of a leaf spring 55 to position so that it resiliently holds each bolt in contact with the front of this plunger.

The novel feature of my invention consists of means whereby the bolt 30 is rotated a portion of a revolution as it travels in front of the plunger 45 so that it may at one point be aligned with the tools 27. When this point occurs positive means are provided for stopping further rotation of the bolt.

Referring to Figures 5 and 7, I have provided a resiliently mounted ratchet 56 having teeth thereon arranged to contact with the corners of the hexagon bolt heads 31. A plurality of coil springs 57 resiliently urge this ratchet into contact with the bolt heads at all times so that as the bolts are pushed through the slot 29 their heads 31 co-act with this ratchet 56 so that they are rotated through about three quarters of a revolution.

One side of the work holder 28 is provided with an elongated slot 58 and a bar 59, secured to one side of the plunger 45, is adapted to reciprocate in this slot. A bracket 60 is fastened to the outer face of the bar 59 which co-acting with this bar forms a pair of spaced bearings for a cylindrical locator 61 reciprocally mounted therein. A suitable coil spring 62 is arranged to urge the locator 61 inwardly through the ear 59 into position against the lower end of the bolt 30. The locator 61, bracket 60, and bar 59, of course, reciprocate with the plunger 45 so that the inner end of this locator is always adjacent to the bolt which is in front of the plunger 45.

The inner end of the locator 61 is provided with a pin 63 adapted to enter the opening 33 when the bolt 30 is rotated by the ratchet 56. When once this pin 63 is urged into this opening by the spring 57 further rotation of the bolt 30 is prevented irrespective of the action of the ratchet 56. The outer end of the locator 61 is provided with a button 64 which slides along a cam runway 65 extending from the work holder 28. When the button 64 is in its two extreme positions of reciprocation, it is forced by the cam runway 65 out of engagement with the bolt 30.

The operation of the locator is such that, as the bolt 30 is pushed through the slot 29 in front of the plunger 45 it will be rotated by the ratchet 56 until the opening 33 therein is aligned with the locator pin 63 at which time the pin will enter this opening and prevent further rotation of the bolt. This action occurs during the first half of the plunger stroke so that further movement thereof only causes the button 64 to rise on the cam slide 65 thereby drawing the pin 63 out of the opening 33. As the plunger and locator are drawn back to pick up another bolt, the first bolt remains in a notch 66 formed in a resiliently mounted block 67.

It will be noted that the plunger 45 does not push the bolt at one operation into its position between the burring tools; however, once the bolts are aligned in the notch 66 the succeeding bolts push them into position between the burring tools.

The operation of my improved device is entirely automatic in that the bolts are automatically fed between the guide bars 35 from where they are individually pushed in front of the plunger 45. As the plunger advances through the slot 29 the individual bolt is rotated until the locator pin 63 enters the opening in the bolt. Further reciprocation of the plunger simply pushes the bolt into the notch 66 wherein it is resiliently retained. The succeeding bolts push the first bolt between the burring tools and after the burring operation has been completed the following bolt pushes the completed bolt from the slot 29 into a suitable receptacle.

Among the many advantages arising from the use of my improved device it may be well to mention that I have obtained a machine which burrs both ends of the cotter pin opening at one time and which is entirely automatic. It is only necessary for the machine operator to keep the hopper 34 filled with bolts to insure continuous operation of the device. A novel part of this invention and one which is of fundamental importance in this machine is that mechanism whereby the bolt is resiliently rotated while it is being pushed in front of the plunger so that a pin may be inserted in the cotter pin opening to prevent further rotation of the bolt after it is aligned with the burring tools.

Some changes may be made in the arrangement, construction, and combination of the various parts of my improved device without departing from the spirit of my invention, and it is my intention to cover by my claims, such changes as may reasonably be included within the scope thereof.

I claim as my invention:

1. In a device for aligning the transverse openings in circular work, means for moving the work in a path substantially perpendicular to its axis, means for rotating the work during said movement, and means adapted to be resiliently urged into said openings when the work is rotated so as to be aligned therewith, which means will prevent further rotation of the work during the remainder of its travel along said path.

2. In a device for aligning transverse cotter pin openings in circular work, means for moving the work in a path substantially perpendicular to its axis, means for rotating the work during said movement, a pin adapted to be resiliently urged into the cotter pin opening when the work is rotated so as to be aligned therewith, which pin will prevent further rotation of the work, and means for drawing said pin out of the opening when in position adjacent to the end of said movement.

3. In a device for aligning cotter pin openings in machine bolts, means for moving the bolt in a plane substantially perpendicular to its axis, a ratchet adapted to resiliently co-act with the head of the bolt to resiliently rotate same, a pin adapted to be resiliently urged into the cotter pin opening when it is rotated in alignment therewith, which pin will prevent further rotation of the bolt, and a rotating burring tool arranged to co-act with said opening when in the aligned position.

4. In a device for burring cotter pin openings in machine bolts, a work holder through which the bolts are adapted to be moved, ratchet means co-acting with the plated heads of said bolts for resiliently rotating same during a portion of said movement, and a spring urged pin adapted to co-act with the cotter pin openings to hold the bolts against further rotation, and a pair of rotating burring tools arranged to simultaneously machine both ends of said openings.

5. In a device for burring cotter pin openings in machine bolts, a work holder, a plunger reciprocally mounted in said holder, means for successively inserting said bolts in front of the plunger so as to be moved through the work holder, a resiliently mounted ratchet arranged to co-act with the bolt heads to rotate same during said movement, a pin mounted to reciprocate with the plunger which pin is resiliently urged into contact with the cotter pin opening when it is rotated into position aligned therewith, and a pair of burring tools aligned with said pin adapted to subsequently machine both ends of the openings.

CARL C. KAMPHAUSEN.